Patented June 24, 1924.

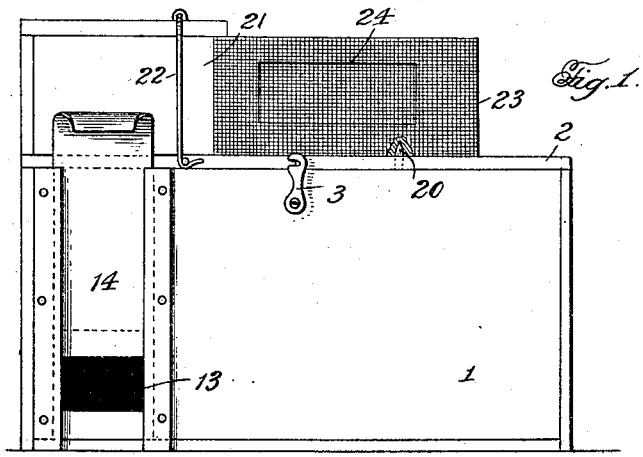
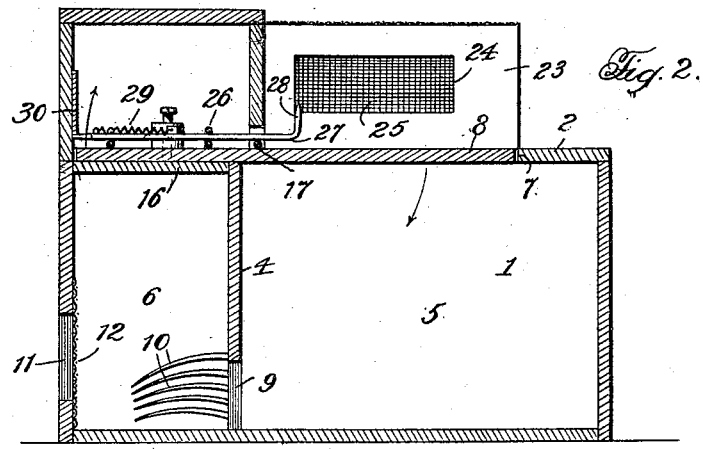
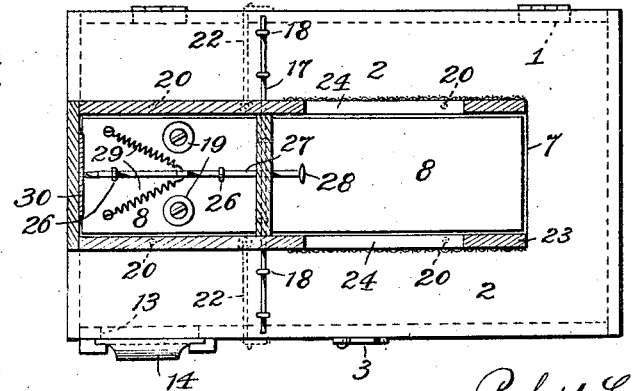

1,499,062

UNITED STATES PATENT OFFICE.

ROBERT S. KNOTTS, OF PINEWOOD, TENNESSEE.

TRAP.

Application filed January 27, 1922. Serial No. 532,291.

*To all whom it may concern:*

Be it known that I, ROBERT S. KNOTTS, citizen of the United States, residing at Pinewood, in the county of Hickman and State of Tennessee, have invented certain new and useful Improvements in Traps, of which the following is a specification, reference being had therein to the accompanying drawing.

This invention relates to traps and more particularly to that type of mouse or rat traps which are known in the art as self-set and ever-set traps.

Heretofore traps of this character employing a bait release platform have not been of practical value, due largely to the fact that when the platform was released the animal could leap to one side or the other and thereby get free of the sinking platform. Also these traps were faulty and therefore of little commercial value by the further reason that the animal was free to walk on and off the platform at will, without his attention being brought to the presence of the bait.

It is therefore the primary object of this invention to avoid the foregoing difficulties and to provide a trap in which the animal when stationed upon the platform is in position to immediately see the bait and be tempted thereby.

Another object attained and which avoids many of the foregoing difficulties, is the provision of means for preventing the animal from springing off of the platform when the trap is sprung, the trap being constructed in such manner that a pull upon the bait trigger in an endeavor to release the bait must always be in the direction of the drop of the platform, so that when the animal releases the bait as the platform begins the drop its own momentum produced by the rearward pull on the bait trigger causes the animal to be projected into the trap and thereby imprisoned.

Another object of the invention is the provision of a simple and efficient structure in which suitable mechanism is provided for automatically setting the trap after each animal is caught and which is so constructed that inspection of the various parts may be made with a minimum labor, and also wherein the trap may be kept in cleanly and sanitary condition.

Still further an important feature of the invention, is in the provision of a trap having two compartments, one in which the mouse is projected from the spring platform and which is maintained in a darkened condition when the spring platform is closed. The other compartment is made light by an opening to the atmosphere covered by a reticulated or foraminous closure member, and which is connected to the first compartment by a guarded opening constructed in such manner, that when the mouse or other animal passes from the first to the second, or from the darkened to the lighted compartment, return passage is prevented.

Further objects of the invention will be apparent to those versed in the art as the following specific description is read in connection with the accompanying drawing, which forms a part of this application and in which:

Figure 1 is a side elevation.

Figure 2 is a vertical, longitudinal section taken through the trap.

Figure 3 is a top plan view with parts broken away to show the construction and arrangement of the platform and bait trigger mechanism.

Referring more particularly to the drawing, 1 represents the trap body formed of any preferred material and in any shape found convenient and practical in practice, here shown as a rectangular box having hinged on one upper side edge a lid or cover 2, which is held in closed position by any suitable form of latch, for instance, such as is shown at 3 in Figure 1. The box as shown in Figure 2 is provided with a partition 4, dividing the casing into compartments 5 and 6, the former having a single entrance opening 7, through the lid 2, which is closed by a trap door 8, as will hereinafter be described. The latter compartment 6, has communication with the compartment 5 through the opening 9, formed in the partition 4, which is guarded by the converging fingers 10, projecting into the compartment 6, as is readily seen in Figure 2. These fingers are of resilient material, preferably metal, and are pointed so that when the mouse or other similar animal passes through the opening 9 by spreading the fingers apart, they will automatically return to their normal position and prevent his return to the compartment 5. The compartment 6 is provided with a light opening 11, closed by a screen wire or other foraminous plate 12, which permits ingress of light to the compartment 6, and thereby produces in the animal the desire to gain access to the compartment 6, in the false hope of escape. The compartment 6 is also provided with a second opening 13, closed by a slide 14, operating in under cut guides secured to the side of the casing 1. This latter opening is provided to release the mice or rats caught in the trap, and it is of course understood that they may be released so as to be projected into a tub of water, or the trap may be wholly immersed in water so as to drown the animals before they are taken out of compartment 6.

The opening 7 extends longitudinally of the top or cover 2, from a point adjacent the front of the trap to the rear end of the cover and is crossed by a supporting member 16, which covers the entire upper portion of the compartment 6, and has its side edges abutting the rear wall and the partition 4 respectively. This member 16 serves also as a support for the rear end of the platform 8, which as shown, is pivoted upon a shaft 17 journalled in bearings 18 secured to the top.

The rear end of the rear platform is preferably weighted as indicated at 19, so that it normally remains in horizontal position with its rear end contacting with the supporting and closure piece 16, and with its forward end, flush with the top of the cover or top.

Extending upward from the cover or top 2, are dowel pins 20, which enter corresponding openings in a platform housing 21, which is removably secured in position on the cover 2 by means of the hooks 22, and which overlies and protects the trigger mechanism to be hereinafter described. This housing is removably secured to the top so that the trigger mechanism may be readily inspected and repaired when necessary, and also to facilitate the placement of bait upon the bait hook.

The forward end of the housing is provided with parallel longitudinal extensions 23, which have openings 24 therein, covered by a screen fabric or other reticulated or foraminous fabric 25, extending over the platform 8, and connecting the upper sides of the extensions 23 so as to form in effect an extension housing protecting all sides of the platform except the entrance and preventing the animal from springing upwardly or sidewise when the trap platform is sprung. This extension housing is at the same time open to the passage of light so that the bait may be in full view of the animal as it steps onto the platform between the extensions 23. The lighting of this passageway to the bait dispels any idea in the animal's mind that he is entering a blind passage.

It is, of course, understood that the extensions, for a mouse trap, are only separated a sufficient distance to permit the free entrance of a mouse therebetween, and prevent turning of the animal on the platform. In other words, the extensions are constructed so that once the animal enters, seeking the bait, the only movement that can be made is a retrograde or backing movement and if this is accompanied by a pulling upon the bait hook, the trap will be sprung and the mouse will be discharged by gravity and his own momentum into the compartment 5, for an animal of this character cannot jump backwards.

Slidably mounted in bearing 26 on the rear end of the platform 8, is a latching bar 27 having formed at its forward end a bait holding trigger 28. This latch bar or rod is normally projected by suitable springs 29, connected to the bar and to the platform as shown in Figure 3, so that the rear end is engaged beneath a keeper plate 30, attached to the rear wall of the housing 21.

After the platform is sprung by a rearward pull on the bait hook 28, and the animal discharged into the compartment 5, the weights 19, upon the rear end of the platform will return the platform to normal position. In this movement the rear end of the latching rod 27 engages approximately mid-way of the keeper plate 30, and slides over the same until the rear end of the platform contacts with the supporting piece 16, at which time the springs 29 will project the rod beneath the lower edge of the keeper plate which locks the platform in horizontal position until another animal walks upon the platform and pulls on the bait hook 28, at which time the operation just described will be repeated.

From the foregoing it will be noted that the trap is so constructed as to be automatically set after each operation, and that as many animals may be caught as the trap will hold. When the bait is used up, the housing 21 and its extension may be removed by releasing the hooks 22, and the bait replaced. The latching mechanism may be also repaired in this manner.

It will be noted that the weights 19 are secured upon the rear end of the platform by screws which pass therethrough so that additional weights may be supplied or the weight of the rear end of the platform lessened by removing certain weights, thereby governing the return action of the platform as desired.

Having thus described my invention, what I claim is:

In an animal trap a casing having an opening in one side thereof, a trap door normally closing said opening, a fulcrum for said door, a latching member arranged to one side of said fulcrum and engageable with a portion of said casing to normally hold the door in said position, and a bait hook connected to the latching means and projecting to the opposite side of said fulcrum, and over the drop end of the door whereby the pull of the animal to release the latching means is in the direction of the drop of the door.

In testimony whereof I affix my signature.

ROBERT S. KNOTTS.